(12) United States Patent
Smith

(10) Patent No.: US 6,854,815 B1
(45) Date of Patent: Feb. 15, 2005

(54) CAROUSEL SHELVING UNIT

(76) Inventor: John T. Smith, 356 Waterfront, Dixon, IL (US) 61021

( * ) Notice: Subject to any disclaimer, the term of this patent is extended or adjusted under 35 U.S.C. 154(b) by 0 days.

(21) Appl. No.: 10/334,533

(22) Filed: Dec. 30, 2002

(51) Int. Cl.[7] .............................................. A47B 49/00
(52) U.S. Cl. ........................ 312/268; 312/97; 312/134; 211/121; 198/802
(58) Field of Search ................................ 211/121, 122; 312/266, 267, 268, 134, 91; 198/703, 710, 706, 798, 800, 801, 802

(56) References Cited

U.S. PATENT DOCUMENTS

| | | | |
|---|---|---|---|
| 1,680,035 A | | 8/1928 | Buckingham |
| 2,442,070 A | | 5/1948 | Bouchard |
| 2,603,547 A | | 7/1952 | Zook |
| 2,703,643 A | | 3/1955 | Parsons |
| 2,704,614 A | * | 3/1955 | St. John et al. ............. 198/802 |
| 3,100,041 A | * | 8/1963 | Sheehan, Sr. ............... 198/802 |
| 3,199,658 A | | 8/1965 | Grabber et al. |
| 3,298,536 A | | 1/1967 | Zippel |
| 3,365,052 A | * | 1/1968 | Kornylak .................... 198/802 |
| 3,664,482 A | * | 5/1972 | Kornylak .................... 198/802 |
| 4,009,919 A | * | 3/1977 | Raasch ....................... 312/268 |
| 4,314,647 A | | 2/1982 | Harris et al. |
| 4,421,227 A | * | 12/1983 | Kornylak .................... 198/800 |
| 4,877,121 A | * | 10/1989 | Yamashita et al. .......... 198/800 |
| 5,513,501 A | * | 5/1996 | Reed ........................... 62/381 |
| 6,119,880 A | | 9/2000 | Dueck |
| 6,598,948 B1 | * | 7/2003 | Harmon ................... 312/31.01 |

FOREIGN PATENT DOCUMENTS

| | | | | |
|---|---|---|---|---|
| JP | 59149206 | * | 8/1984 | ................ 312/268 |
| WO | 9317599 | * | 9/1993 | ................ 312/268 |

* cited by examiner

*Primary Examiner*—Lanna Mai
*Assistant Examiner*—Hanh V. Tran
(74) *Attorney, Agent, or Firm*—Keith Frantz (57) ABSTRACT

A powered carousel shelving unit is configured to bring individual shelves to a standard handicap accessible height at a front access opening for viewing and selection of product on the shelves. Stationary guide tracks and complimentary tracking elements connected to the shelves are cooperative to tip the shelves forward as they approach and leave the access area so as to organize the product to the front of the shelves.

20 Claims, 8 Drawing Sheets

CAROUSEL SHELVING UNIT

CROSS-REFERENCES TO RELATED APPLICATIONS

None.

REFERENCE TO MICROFICHE APPENDIX

N/A.

STATEMENT REGARDING FEDERALLY SPONSORED RESEARCH OR DEVELOPMENT

N/A.

BACKGROUND OF THE INVENTION

1. Field of Invention

The present invention relates generally to shelving to display product for viewing and selection.

More particularly, the invention relates to a powered carousel shelving unit configured to bring the shelves to a standard height for viewing and selection of the product on the shelves, and in which product is automatically organized to the front of the shelves.

2. Description of Prior Art

Retail stores commonly display merchandise on fixed-position shelves for viewing and selection by a consumer. However, such use of conventional shelves has certain drawbacks and disadvantages to both the store and the consumer. For example, use of conventional shelves to display merchandise can result in inefficient use of floor space because it limits the useable height of shelving to that which the consumer can reach. Space above this height is either not used, or must be accessed by store personal with a ladder. Use of conventional shelves also presents obstacles to consumers that cannot reach the top or bottom shelves; such as consumers in wheelchairs or mobile carts, consumers with certain disabilities or disabling injuries, and consumers that are simply shorter than average. And a stock person is required to periodically bring the merchandise to the front of the shelves for good product presentation and ease of viewing and selection by the consumer.

Shelves configured for vertical carousel rotation present the potential to use the space above conventional fixed-position shelves for storing merchandise that can be brought to all consumers. A variety of carousel shelving units are known and have been used in a variety of settings for various purposes. For example, Zook, U.S. Pat. No. 2,603,547; Bouchard, U.S. Pat. No. 2,442,070; Buckingham, U.S. Pat. No. 1,680,035; Harris et al., U.S. Pat. No. 4,314,647; Parsons, U.S. Pat. No. 2,703,643; Graber et al.; U.S. Pat. No. 3,299,658; Zippel, U.S. Pat. No. 3,298,536; and Dueck, U.S. Pat. No. 6,119,880 all disclose vertical carousel shelving units of different configurations, some of which are intended to display merchandise in retail stores. However, none of these carousel shelving units have gained widespread acceptance in the retail industry. To date, no efficient or effective carousel shelving unit is available or in wide spread use in retail stores, and no current carousel shelving unit addresses the need to employ a stock person to maintain merchandise on the shelves in an organized manner.

SUMMARY OF THE INVENTION

The general aim of the present invention is to provide an improved carousel shelving unit which, while suitable for other uses, is particularly useful in retail stores for convenient viewing and selection of product from the shelves by consumers.

A important objective of the invention is to provide a carousel shelving unit that brings the product on the shelves to a standard, handicap accessible height for product viewing and selection by all consumer.

Another important objective is to provide a carousel shelving unit in which product is periodically and automatically brought to the front of the shelves during normal operation of the unit.

Another important objective of the invention is to provide a carousel shelving unit that enables display of substantially more product information than is available with conventional shelving units.

Yet another important objective is to provide a carousel shelving unit equipped with safety features to insure safe operation by the casual user.

Accomplishment of the above objectives results in a unique carousel shelving unit that: presents product at a height accessible to all persons, including persons in wheelchairs, without reducing shelf count in a fixed floor space; promotes consumer convenience and consumer safety by eliminating the need for the consumer to reach up or down from his or her normal comfort range as can be associated with product selection from conventional shelves; achieves a visually consistent and pleasing product presentation at the front of the shelves, and thus further promotes ease of product viewing and selection, without the cost of employing a stock person to periodically check and organize the shelves; and enhances efficient use of floor space, with increased product availability in the same floor square footage, as compared to easily viewed and accessible product on a standard shelf unit.

These and other objectives and advantages of the invention will become more apparent from the following detailed description when taken in conjunction with the accompanying drawings.

Briefly, according to the invention, there is provided a carousel shelving unit that brings organized product on shelves to a standard, handicap accessible height for product viewing and selection by the consumer.

In accordance with one aspect of the invention, the carousel shelving unit is provided with a plurality of shelves that are pivotally suspended in a normal horizontal position for movement along a vertical carousel path. The carousel path is characterized as having a front path segment, a back path segment, and top and bottom path segments connecting the front and back path segments together to establish a continuous path. A controllable drive unit is connected for powered movement of the shelves along the carousel path, and for positioning of individual shelves at a predetermined access height along the front path. A pair of stationary track systems is located on each side of the shelves, tracking generally along the carousel path of the shelves. The shelves are provided with tracking elements connected for movement therewith and operatively engaging the track systems as the shelves travel along the carousel path. The track systems are provided with front cam-track segments that are configured to cam the tracking elements as the move therethrough to pivot the front of said shelves downwardly from horizontal to a forwardly tipped position, whereby contents on the shelves slide towards the front of the shelves, and then back to horizontal as the shelves travel therethrough.

In preferred embodiments, the cam-track segments include inner and outer track segments, and the tracking elements include inner and outer tracking elements that operatively engage the inner and outer track segments, respectively. The track segments are configured to effect pivoting of the tracking elements from a first position that is associated with the horizontal position of the shelves to a second position that is associated with the tipped position of the shelves and the back to the first position as the shelves move therethrough.

The invention contemplates providing the inner and outer track segments of the cam-track segments with respective cam surfaces that progress from parallel to non-parallel and back to parallel, and providing the inner and outer tracking elements in a normal skewed alignment associated with the horizontal position of the shelves such that the cam surfaces effect pivoting of the tracking elements away from and then back to their normal skewed position and the shelves from horizontal to tipped and back to horizontal as the shelves travel through the cam-track segments.

The invention alternately contemplates providing the inner and outer track segments of the cam-track segments with respective cam surfaces, one of which is lengthened as compared to the other, and providing the inner and outer tracking elements in a normal non-horizontal alignment position associated with the horizontal position of the shelves, to effect the pivoting and return of the tracking elements as the shelves as they travel through the cam-track segments.

In one embodiment, the inner and outer track segments are provided with respective cam surfaces that approach one another and then recede from one another, and the inner tracking elements are positioned above the outer tracking elements. In this instance, the cam surfaces are configured to cam the tracking elements towards horizontal, to effect tipping of the shelves, and to then return the tracking elements to their previous position to return the shelves to horizontal as they travel through the cam-track segments.

In an alternate embodiment, the inner and outer track segments are provided with respective cam surfaces that recede from one another and then approach one another, and the inner tracking elements are positioned below the outer tracking elements. In this instance, the cam surfaces are configured to cam the tracking elements towards vertical alignment, to effect tipping of the shelves, and to then return the tracking elements to their previous position to return the shelves to horizontal as they travel through the cam-track segments.

In accordance with other aspects of the invention, and in carrying out a preferred embodiment, the carousel shelving unit includes a set of shelves mounted for vertical carousel rotation in an upright cabinet. The cabinet is provided with structural frame elements and cover panels generally enclosing at least the front and sides of the cabinet. The closure panels are suitable for placement of product information and/or advertising. The cabinet is further provided with a front opening at a handicap accessible height for access to product on the shelves, and safety doors connected above and below the access opening. The shelves are pivotally suspended at each end, to a normal horizontal position, from a pair of endless loop drive chains located on each side of the cabinet for carousel rotation therewith through a path along the front and back of the cabinet, and around sprockets located at the top and bottom of the cabinet. The chains are power driven with a drive unit such as an electric motor to establish a positive drive system at both ends of the shelves. The drive unit is bi-directional in operation for bi-directional rotation of the shelves. Manually operable switching controls located at the front of the cabinet near the access opening, at a height convenient for all users, initiate and control movement of the shelves past the access opening. Directional indicia are located near the switch controls to indicate direction of movement, either up or down, along the front of the unit. A track system comprising generally parallel, inner and outer guide track are located on each side of the shelves, outwardly of the drive chains along the front and back of the unit and around the top and bottom sprockets. Guide tracking elements are connected at each end of the shelves for movement therewith. The guide tracking elements include a front set of elements and a back set of elements, each set comprising an inner and an outer tracking element. The shelves are slidably engaged in the inner and outer guide tracks via engagement of the inner and outer tracking elements therein. The guide tracks are configured to maintain the shelves in a generally horizontal position throughout most of the carousel path, but are provided with cam-track segments above and below the front access opening that are adapted to temporarily tip the shelves forwardly as they pass therethrough. In particular, the inner and outer track segments of the cam-track segments are of different operative guiding lengths to pivot the tracking elements from their normal position, and tip the front of the shelves downwardly, as the shelves enter the cam-track segments, and to then pivot the tracking elements back to their normal position, returning the shelves to their horizontal position, as the shelves exit the cam-track segments. Consequently, the product on the shelves slides towards and automatically organizes at the front of the shelves each time a shelf travels through a cam-track segment when traveling both towards and away from the access opening. The safety doors are pivotally connected for swinging between a closed position that establishes the top and the bottom of the access opening, and an open position that automatically stops movement of the shelves and disables further operation of the drive unit until the doors are closed. Thus, the safety doors and associated sensors detect the presence of an object in the access opening while the shelves are moving, and prevent a user's arm or other foreign object from becoming trapped by the moving shelves. Additional sensors detect an improperly sized or positioned product on the shelves to prevent damage to the unit therefrom.

Reference numerals shown in the drawings correspond to the following:
10—carousel shelving unit
12—cabinet frame elements
14—cabinet base
16—cabinet closure panels
18—front access opening
20—bi-directional operating controls and directional indicia
22—area for advertising and information
24—individual shelves
24a—shelves shown in tipped position
24b—shelf front lip
24c—shelf back wall
24d—shelf side/end walls
26—drive chains
28—sprockets
30—sprocket support brackets/bearing plates
32—pivot pins
34—shelf retaining fasteners
36—electric motor drive unit
38—rotary power transmission shaft
40—sprocket drive gears
42—guide track systems
44a—inside track, lower guide pins
44b—outside track, upper guide pins
46—front track segments
48—back track segments
50—top crossover track segments
52—bottom crossover track segments
54—cam-track segments
56—inside tracks
56a—lower track segments in top cross-over 50
56b—lower track segments in bottom cross-over 52
56c—inside track segments in cam-track segments 54
56d—upper separation in lower track segment 56a
56e—continuous lower guide edge in lower track segment 56a
58—outside tracks
58a—upper track segments in top cross-over 50
58b—lower track segments in bottom cross-over 52
58c—outside track segments in cam-track segments 54
58d—lower separation in upper track segment 58a
58e—continuous upper guide edge in upper track segment 58a
60—safety doors
60a—inside radius profile on safety door
60b—safety door hinge
62—safety door position sensors
70—alternate embodiment top crossover track segments
72—alternate embodiment bottom crossover track segments
74—alternate embodiment cam-track segments
76—alternate embodiment back track segments
78—alternate embodiment inside tracks
78c—inside track segments in cam-track segments 74
80—alternate embodiment outside tracks
80c—outside track segments in cam-track segments 74
82—alternate embodiment shelves
84a—inside track, upper guide pins
84b—outside track, lower guide pins
A—pivot axis of shelf While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 1:
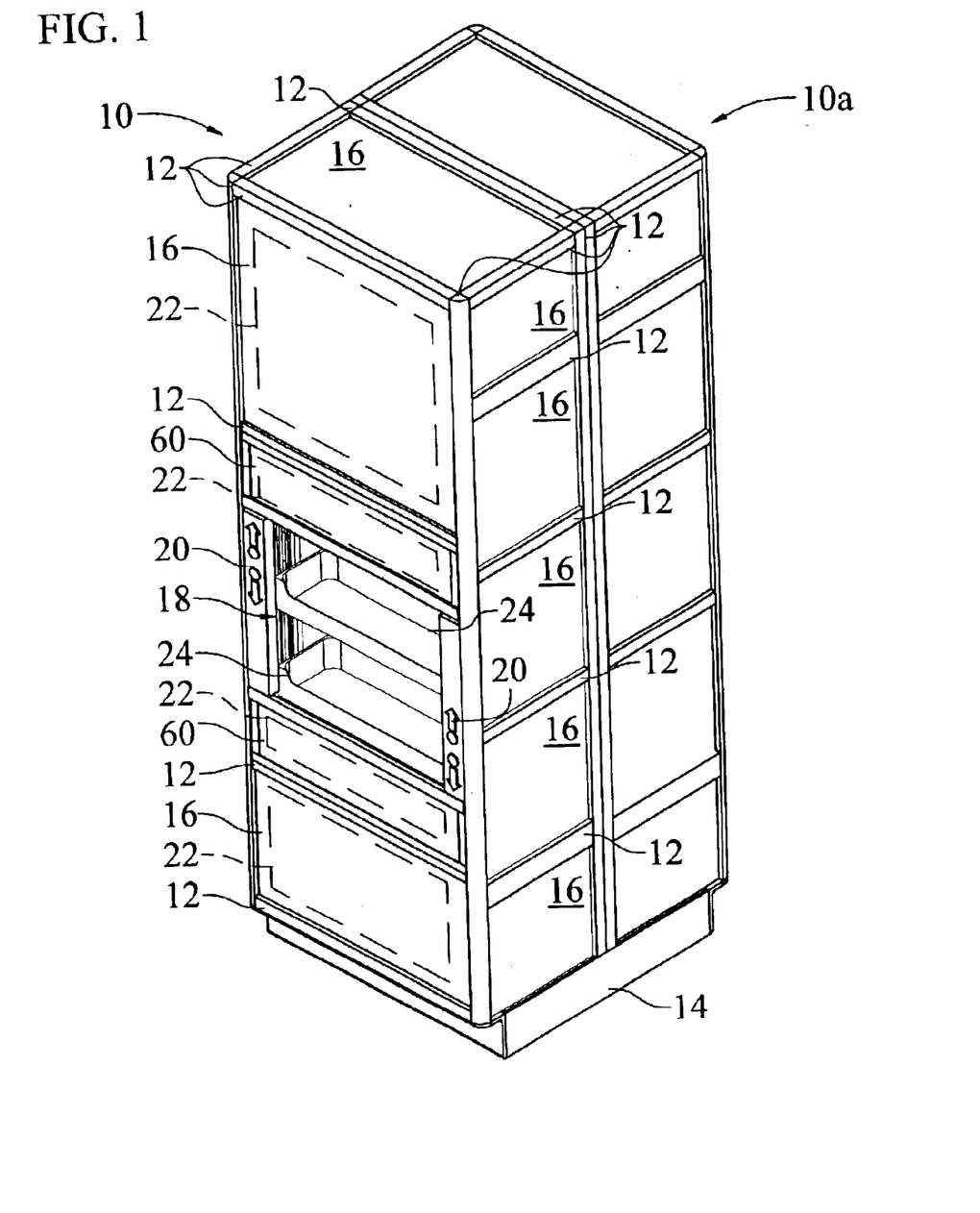
FIG. 1 is a front perspective view of a new and improved carousel shelving unit incorporating the unique aspects of the present invention, and showing a rearwardly facing second carousel shelving unit therewith to establish a double-isle implementation.
Figure 2:
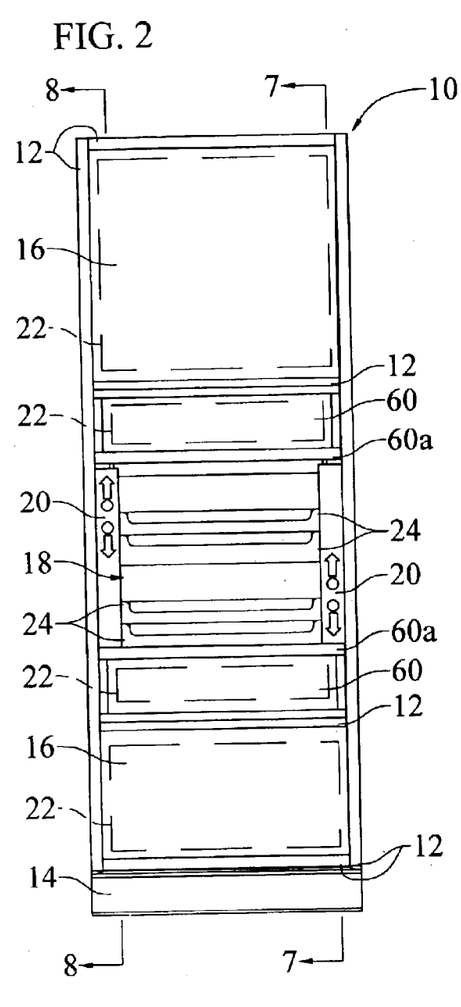
FIGS. 2 and 3 are front and right side elevation views, respectively, of the carousel shelving unit shown in FIG. 1.
Figure 3:
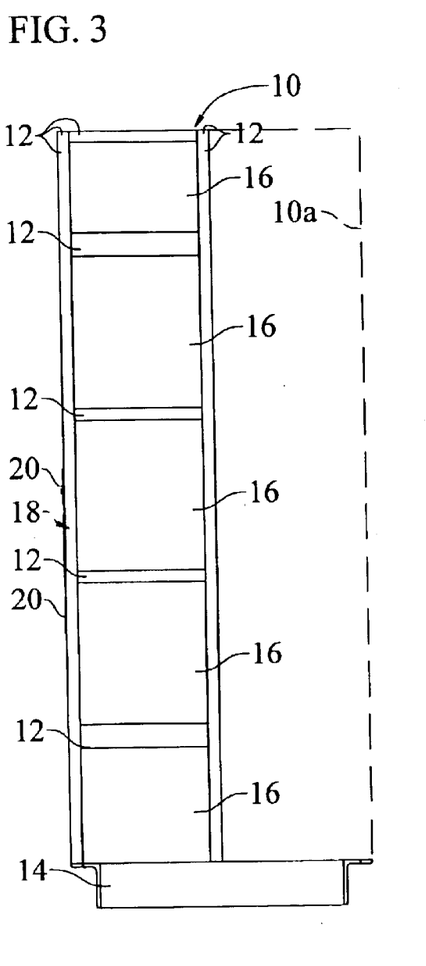
Figure 4:
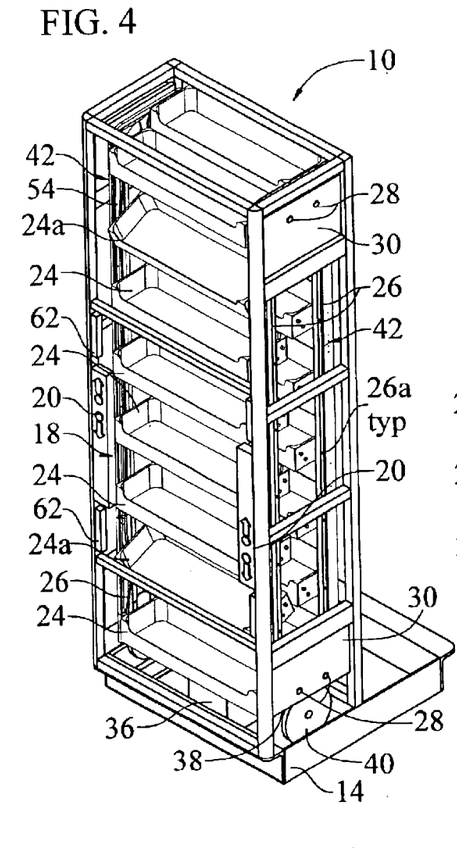
FIGS. 4 and 5 are front and rear perspective views, respectively, of the carousel shelving unit, but with the cabinet cover panels removed to further expose the shelves and certain other parts therein for illustrative purposes.
Figure 5:
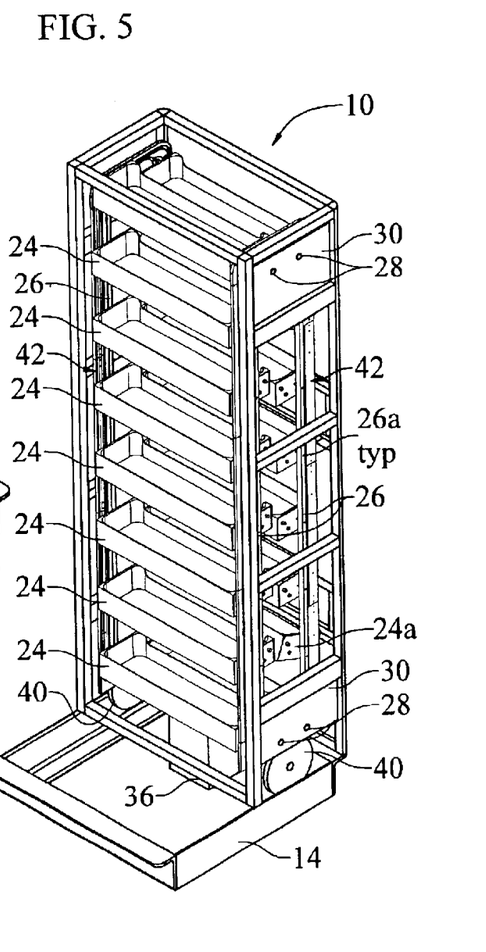
Figure 6:
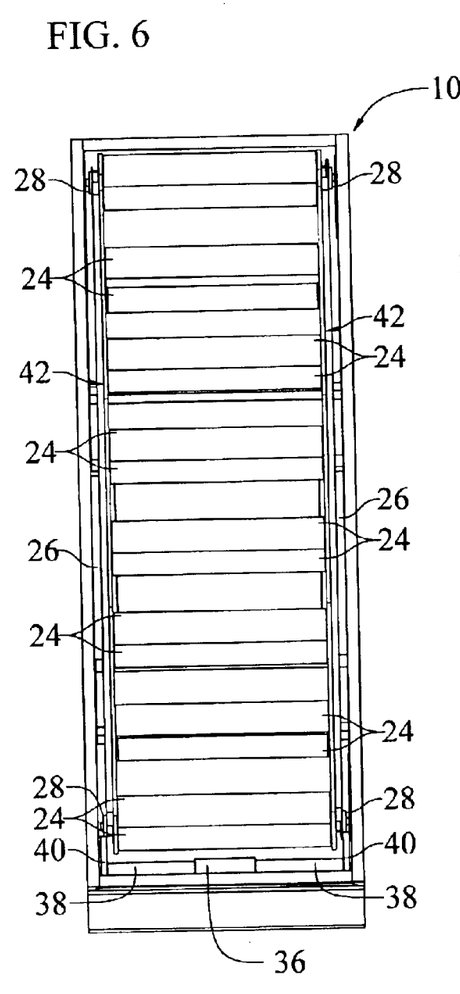
FIG. 6 is a rear elevation view of the carousel shelving unit.
Figure 7:
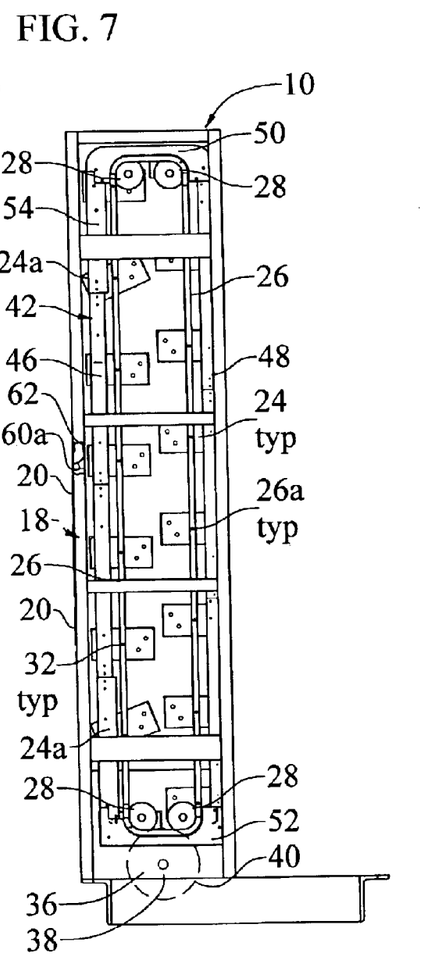
FIG. 7 is an inside view of the carousel shelving unit as taken substantially along the line 7—7 of FIG. 2.

Referring now to FIGS. 1–3, there is shown a carousel shelving unit 10 in accordance with the invention.

Briefly, the shelving unit 10 includes an upright cabinet, and a set of shelves 24 mounted in the cabinet for vertical power-driven carousel rotation therein. The cabinet includes an upright frame structure established with frame elements 12 secured together, and closure panels 16 connected to the frame elements to generally enclose the carousel-mounted set of shelves. In the embodiment shown, a base 14 supports the cabinet in its vertical position from a floor or other foundation. In this instance, the base is sized for supporting either a second carousel shelving unit 10a as shown facing in the opposite direction, or a set of standard fixed shelves in the space behind the carousel shelving unit 10 for provision of a double-isle unit.

An open access area 18 is provided in the front of the cabinet for viewing and selection of product on the shelves 24 by the consumer. The access opening is established at a position and height for product accessibility therethrough by consumers both standing and in wheelchairs. In particular, the access opening is preferably provided at a suitable height designated in accordance ANSI standards, or other industry or government standards for wheelchair accessibility.

Manual operating controls 20 are placed to the sides of the front access opening. The controls are operable to initiate and stop carousel rotation of the shelves both up and down past the front access opening. The controls shown include a pair of button switches to initiate and stop rotation of the shelves, and directional indicia in the form of indicator arrows associated by proximity with the buttons to indicate up and down directional movement of the shelves. The controls are provided as two complete sets, with one set at a height for convenient operation by an adult standing in front of the unit, and the other set at a lower elevation for convenient operation by a child or a person in a wheelchair.

Product information, advertising, graphics, operating instructions and other information is conveniently placed on the front cabinet panels 16 as indicated by dashed lines 22. Alternately, for example, the front panels may be constructed from transparent materials to enable the user to see the product on the shelves above and below the access opening.

As shown in FIGS. 4–7, wherein the unit 10 is shown without the closure panels, the carousel-mounted shelving comprise a plurality of individual shelves 24 that are pivotally suspended in spaced relation from a pair of endless loop or continuous timing/drive chains 26, as indicated at 26a, on each side of the cabinet for movement therewith. The drive chains extend vertically along the front and back of the cabinet, and around sets of sprockets 28 that are rotatably mounted to bearing support plates 30 near the top and bottom of the cabinet to establish the vertical carousel path of the shelves. A bi-direction power drive unit 36, such as an integrated electric motor drive and gearbox, is located in the base 14 of the cabinet. The motor is coupled to the lower sprockets 28 on each side of the cabinet with a rotary output shaft 38 and associated drive gears 40 at each end, and is responsive to the operating controls 20, to initiate and stop the carousel rotation of the shelves. The dual-drive chain/sprocket system, with sprockets and a chain driving each end of the shelves, and with the sprockets on both sides being driven by a single motor, insures precise timing of the carousel rotation of the shelves in the unit.

Figure 10A:
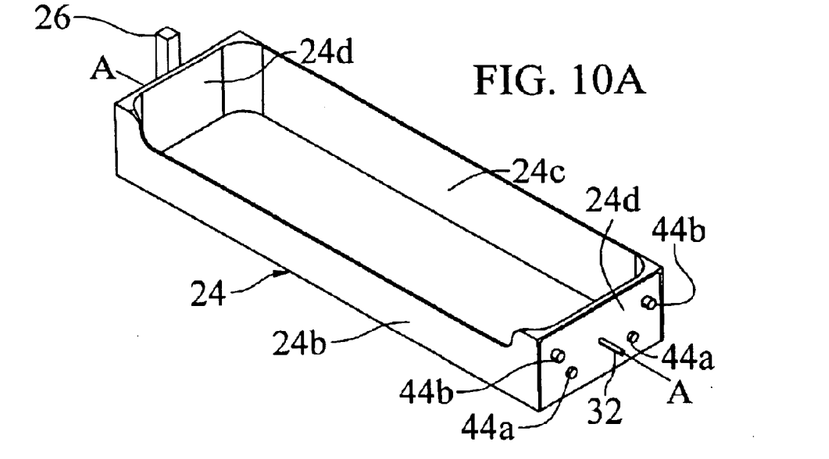
FIGS. 10A and 10B are enlarged front and rear perspective views, respectively, of an individual shelf of the carousel shelving unit, and showing the left end connected to a drive chain of the carousel shelving unit.
Figure 10B:
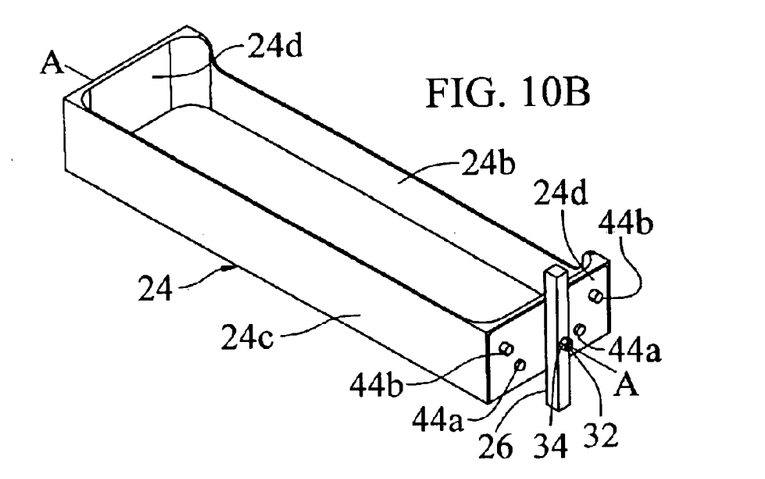
Figure 11:
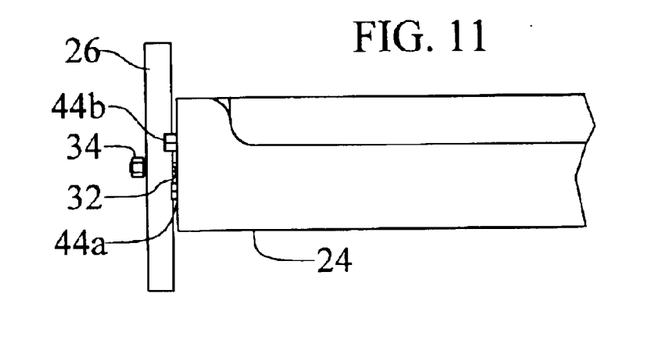
FIG. 11 is an enlarged fragmentary front view of the left end of a shelf pivotally connected to the drive chain.

Referring to FIGS. 10A–B and FIG. 11, each shelf includes a front lip 24b, a back wall 24c, and opposing ends 24d. The front lip, and side and back walls are shown as solid walls. However, it will be understood that the front lip and walls may be alternately provided in the form of stiff screen or other structure to maintain the product on the shelves during movement thereof. The shelves are further provided with pivot pins 32 that extend outwardly from both ends of the shelves for connecting to the drive chains 26 and pivoting about a longitudinal axis "A" extending therethrough. The pivot pins slip through links in the chains at 26a, and are pivotally secured in position with a fastener at the free end of the pivot pins, with, for example, a retaining ring, a pin, a locking threaded fastener 34, or other securing devices that permit pivoting of the shelves in the chains.

The shelves 24 are also positioned in the carousel shelving unit 10 for guided interaction with a pair of endless loop stationary guide track systems 42. The guide track systems are mirrored on each side of the unit (see e.g., FIGS. 4–6), and extend continuously along the front and back of the unit and around the top and bottom sprockets 28 of the chain drive system. The guide track systems, in cooperation with the chain drives 26, are configured to maintain the shelves in a horizontal position throughout most of the carousel path, but to temporarily tip the shelves forwardly (i.e., pivot the shelves about axis "A" such that the front of the shelves pivots downwardly with respect to the back of the shelves) above and below the front access opening at the front of the unit. As a result, the product on the shelves will automatically slide to the front of the shelves, stopping and organizing at the front lip 24b, each time the shelf travels from the front access opening in either direction, or towards the access opening as it rounds past the top or bottom of the unit. Consequently, the product is conveniently placed at the front of the shelves for the consumer to view and select, and the need for periodic restocking by store personnel is eliminated. This operational characteristic, combined with the access opening 18 at a height that is handicap accessible, is particularly advantageous for convenience of use of the unit by a person in a wheel chair.

Each track system 42 includes inner and outer tracks, 56 and 58, respectively, that slidably accept and guide inner and outer guide tracking elements that are connected for movement with the ends of the shelves. In the embodiment shown, the inner and outer tracking elements are provided in the form of inner and outer guide pins, 44a and 44b, respectively, extending outwardly from the ends 24d of the shelves. As shown in FIGS. 10A–B, the inner and outer guide pins 44a, 44b are provided as a front set of inner and outer pins, and a back set of inner and outer pins. The guide pins are positioned in alignment between the two ends of the shelves; the outer guide pins 44b are positioned above the inner guide pins 44a; and the front and back set of guide pins are mirrored about the longitudinal pivoting axis "A" of the shelves.

Figure 8:
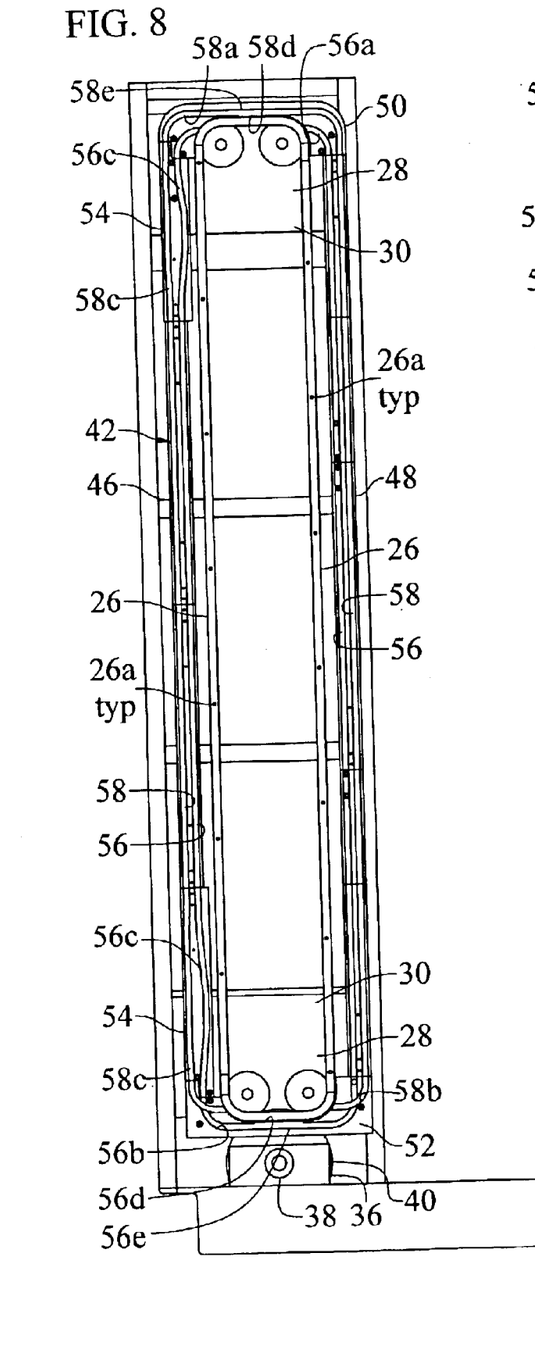
FIG. 8 is an enlarged inside view of the carousel shelving unit as taken substantially along the line 8—8 of FIG. 2.
Figure 9A:
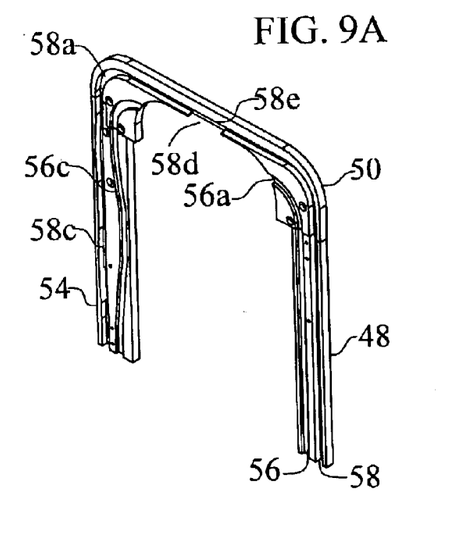
FIGS. 9A and 9B are enlarged fragmentary perspective views of the upper and lower portions, respectively, of the shelf guide tracking system shown in FIG. 8.
Figure 9B:
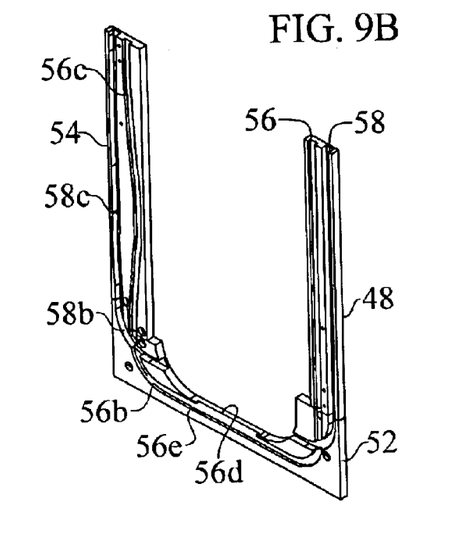

Referring to the enlarged views of FIGS. 8 and 9A–B, the guide track system 42 is provided with front and back vertical track segments, 46 and 48, respectively, and top and bottom track crossovers, 50 and 52. The front and back track segments extend parallel to the front and back lengths of the drive chains 26, and are each provided with continuous segments of the inner and outer tracks 56 and 58. In general, the top track crossover 50 includes an upper track segment 58a that operatively interconnects the front and back track segments of the outer track 58, and a lower track segment 56a that operatively interconnects the front and back track segments of the inner track 56. More particularly, the lower track segment 56a is provided as an interrupted track segment, with (i) curved track segments at the front and back corners to guide the front and back, respectively, inner/lower guide pins 44a as the shelf travels around the front and back corners, and (ii) an open center portion to enable passage and cross-over of the outer/upper guide pins 44b between the corners. The upper track segment 58a is provided with a continuous upper guide edge 58e and lower corner edges separated as at 58d to allow the front and back upper guide pins 44b to swap engagement therein as the shelf travels between the front and back of the unit.

Similarly, the bottom track crossover 52 includes an upper track segment 58b that interconnects the front and back track segments of the outer track 58, and a lower track segment 56b that interconnects the front and back segments of the inner track 56. The lower track segment 56b of the bottom track cross-over is provided with a continuous lower guide length and upper corner edges separated as at 56b to allow the front and back lower guide pins 4a to swap engagement therein as the shelf travels between the front and back of the unit. And the upper track segment 58b is provided as an interrupted track segment, with (i) curved track segments at the front and back corners to guide the front and back, respectively, upper guide pins 44b as the shelf travels around the front and back corners, and (ii) an open center portion to enable passage and cross-over of the lower guide pins 44a between the corners. The track segments 58b and 56b cross one another as shown to maintain integrity of the inner and outer tracks.

The guide track systems 42 further include shelf-tipping cam-track segments 54 above and below the front access opening 18, proximate the top and bottom of the unit. The cam-track segments 54 are provided with inner and outer track segments 56c and 58c that are cooperative to tip the shelves forwardly from horizontal as they enter the cam-track segment, from either direction, and to then tip the shelves back to horizontal as they exit the segment. In general, the inner and outer track segment 56c and 58c are configured to separate away from and then return toward one another to effect the temporary shelf-tipping cam action described. In the embodiment shown, the outer track segment 58c extends vertically between the front track segment 46 and the associated upper track segments 58a, 58b in the track cross-over segments 50, 52, and the inner track segments 56c angle smoothly away from and then toward the outer track segment 58c to establish a lengthened inside cam-track therealong. The effect of this angled and lengthened inside track segment is to pivot the front set of guide pins towards horizontal alignment, and cam the shelf forwardly as it passes therethrough, and to then return the guide pins and shelf back to their normal position as the shelf exits therefrom.

Figure 12A:
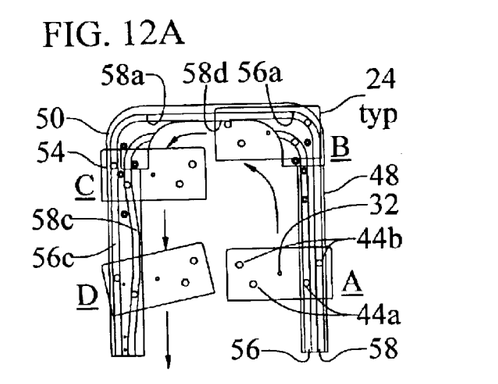
FIGS. 12A–C are enlarged fragmentary views of the upper portion of the shelf guide track system, and illustrating successive positions of shelves A–D therein.
Figure 12B:
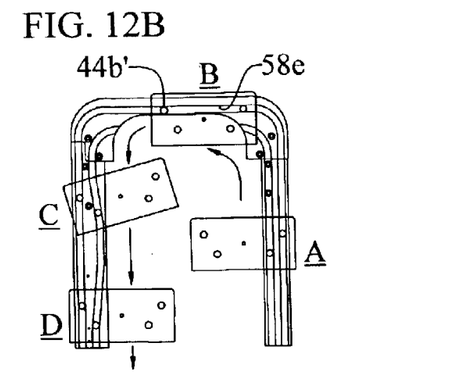
Figure 12C:
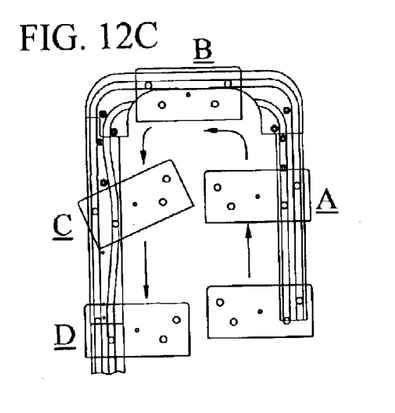

Referring to the enlarged views of the upper portion of the guide track system 42 illustrated in FIGS. 12A through 12C, there is shown the interaction between the upper track crossovers 50, the shelf-tipping segments 54 at the top of the unit, the back track segments 48, and the guide pins 44a, 44b of the shelves 24 with successive positions and associated directional arrows of four shelves identified as A–D as they travel along the carousel path from the back to the front of the unit. Of course, the shown and below described sequence will apply in reverse order for shelves traveling from the front of the unit to back along the carousel path.

Figure 13:
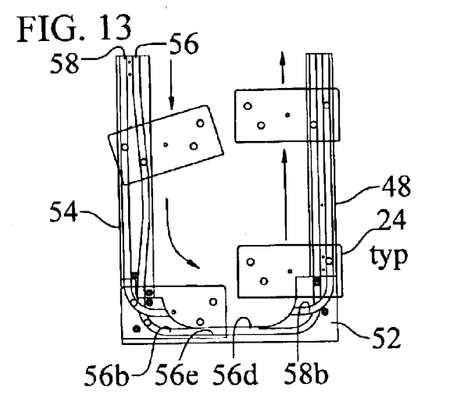
FIG. 13 is an enlarged fragmentary view of the lower portion of the shelf guide track system, and illustrating successive positions A–D of a shelf therein.

In particular, shelf A is shown (FIGS. 12A–C) progressing toward the top of the unit along the back track segment 48, with the back set of guide pins 44a, 44b in the vertical track segments of 56, 58 therein. Shelf B is shown initially in the back corner of the top cross-over 50 (FIG. 12A), with the back upper guide pin 44b located in the upper track segment 58a, the front upper guide pin 44b' preparing to pass through the cutout 58d of the upper track segments, the back lower guide pin 44a located in the lower back-corner track segment 56a, and in a position corresponding to a position of Shelf A following the position shown in FIG. 12C. Shelf B is then shown progressing through the center of the crossover (FIGS. 12B–C), after the front upper guide pin 44b' has passed through the cutout 58d of the upper track segment 58a, with both upper guide pins in the upper track segment and guided by the continuous segment upper edge 58e and both lower guide pins 44a in the open portion between the corner track segments 56a. Shelf C is shown initially entering the cam-track segment 54 (FIG. 12A), having exited the top cross-over, with the back upper guide pin 44b having exited the upper track segment 58a through cutout 58d and the front lower guide pin 44a having entered and passed through the corner track segment 56a, with the front set of guide pins in the inner and outer tracks 56c, 58c of the cam-track segment 54, and in a position corresponding to a position of Shelf B following the position shown in FIG. 12C. Shelf C is then shown in a forwardly tipped position near the top of the cam-track segment (FIG. 12B), and maintaining the tipped position mid-way through the cam-track segment (FIG. 12C). Shelf D is shown initially in a forwardly tipped position exiting the bottom of the cam-track segment 54 (FIG. 12A), and in a position corresponding to a position of Shelf C following the position shown in FIG. 12C. Shelf D is then shown after having returned to its normal horizontal position (FIG. 12B) and then progressing downwardly into and along the front track segment 46 (FIG. 12C). Interaction between the lower track crossovers 52, the shelf-tipping cam-track segments 54 at the bottom of the unit, and the guide pins 44a, 44b, and associated tipping of the shelves at the bottom of the unit, is shown with similar successive positions A–D of a shelf 24 in FIG. 13.

With the foregoing arrangement, the guide track systems 42 and guide pins 44a, 44b are operative to temporarily tilt the shelves forwardly, and the product on the shelves automatically slides to the front of the shelves, as each shelf passes through the cam-track segments 54 traveling toward and away from the front access opening during operation of the unit. Consequently, use of the carousel shelving unit results in presentation of product at the front of the shelves for the convenience of viewing and selection by the consumer.

Figure 14A:
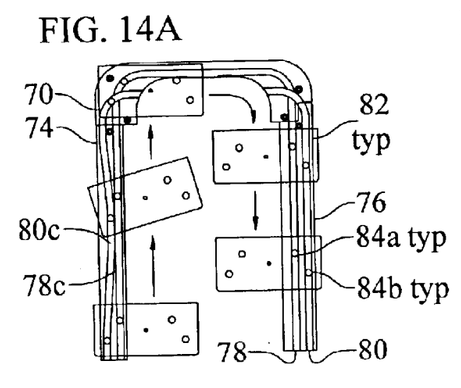
FIGS. 14A–B are enlarged fragmentary views of upper and lower portions of an alternate embodiment guide track system, and illustrating successive shelf positions therein.
Figure 14B:
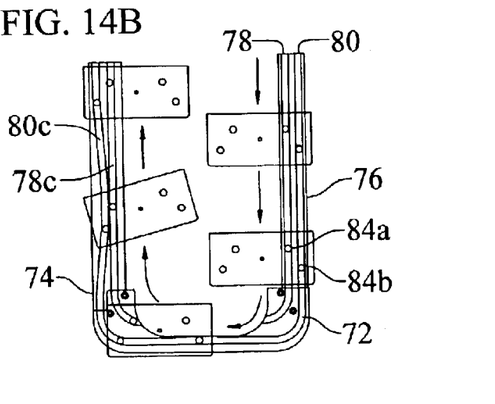

Referring to FIGS. 14A–B, there are shown upper and lower portions of an alternate embodiment track system comprising top crossover track segment 70, bottom crossover track segment 72, front cam-track segments 74 and back track segments 76. As shown, this alternate track system is configured similar to track system 42, except that crossover of the inner and outer tracks, 78 and 80, respectively, occurs in the top crossover segment 70, and the associated cam-track segments 78c, 80c approach and then recede from one another to effect temporary forward pivoting of the shelves as they travel therethrough. In this instance, the shelves 82 are provided with inner guide pins 84a are positioned above and in skewed alignment with the outer guide pins 84b, and the track cam-track segments 78c and 80c are operative to pivot the guide pins towards vertical alignment then back to their original position to effect the temporary tipping of the shelves.

Figure 15:
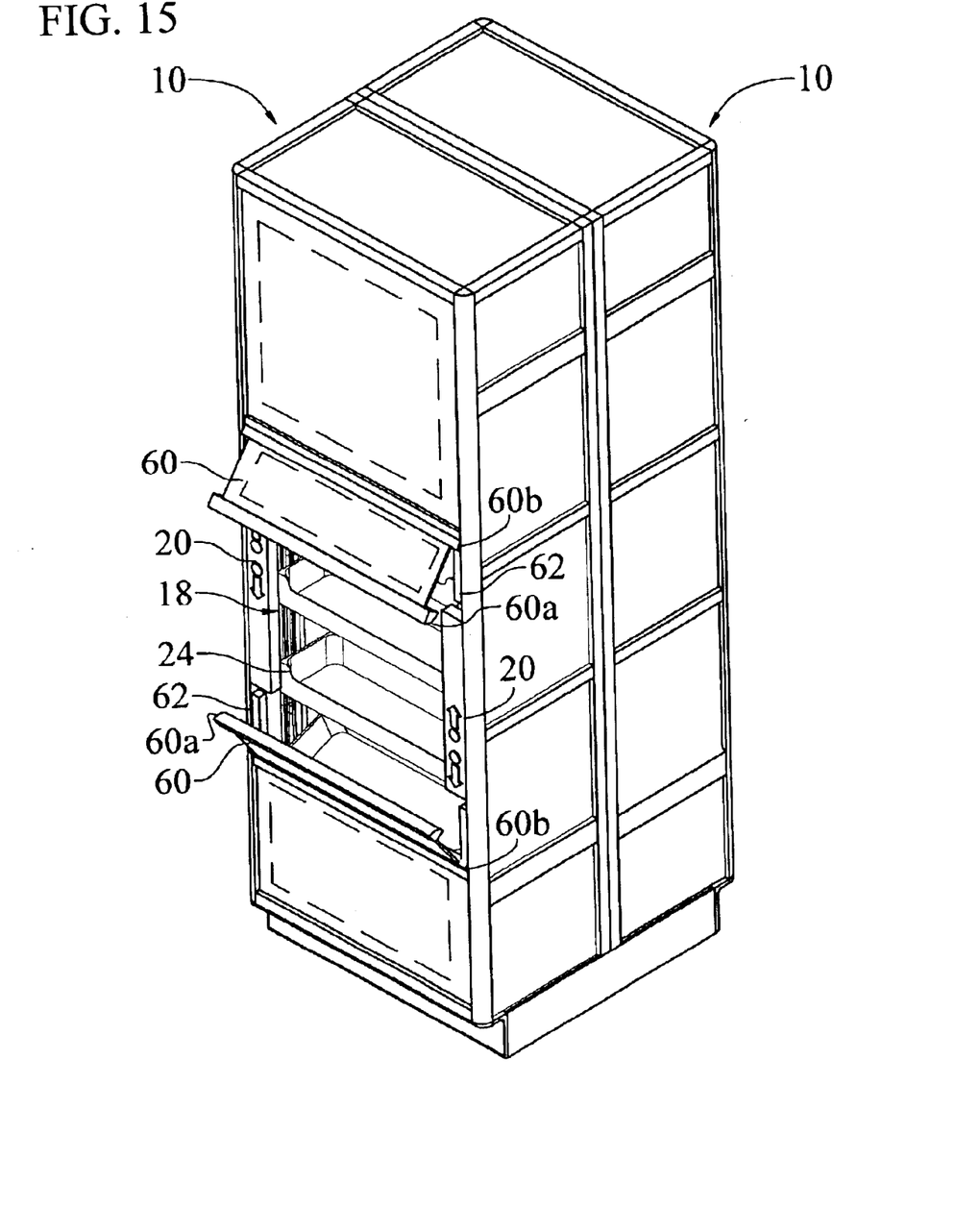
FIG. 15 is a perspective view similar to FIG. 1 but showing normally closed safety doors pivoted into in an open position.

The carousel shelving unit 10 is provided with safety apparatus to prevent operation of the unit in the presence of an object in the access opening 18. This prevents injury to a consumer from his or her arm or hand becoming trapped in the unit while reaching for a product on a shelf, and damage to the unit from the presence of a foreign object in the access opening. More particularly, the carousel shelving unit is equipped with safety doors 60 located above and below the front access opening 18, and sensors as generally indicated at 62 operatively connected to sense any movement of the safety doors and to the electric motor and/or unit controls to stop movement of the shelves if either door is ajar. As shown in FIG. 15, the safety doors are hinged at 66b oppositely of the front access opening 18 for swinging open away from the opening, and are lightly spring biased to their normal closed position as shown in FIGS. 1–3. In the event that a consumer's hand or other object is inadvertently located inside the access opening while the shelves 24 are moving, and such object is brought into contact with either of the safety doors 66 by the moving shelves, or otherwise, the safety doors immediately swing open, and the sensors 62 stop movement of the shelves before the object is carried or forced into a stationary frame element 12 or other stationary object above or below the access opening. Once the object is removed, the safety doors swing back to their normal closed position, and the sensors restore normal operation of the unit. To assist the doors in providing immediate response to the presence of an object in the access opening, the inside corners of the safety doors are provided with a smooth radius profile 66a that faces the access opening. This profile result in a force component in the horizontal direction, to cause the doors to immediately swing ajar, upon contact at any angle from inside the access opening. Consequently, the safety doors, sensors and associated disabling shutdown function prevents an object from becoming trapped between a moving shelf and the top or bottom of the access opening, and thereby precludes the possibility of injury to consumers from the moving shelves and damage to the shelving unit.

The carousel shelving unit 10 is further provided with safety features to prevent damage to the machine from an inappropriately sized or positioned product on a shelf 24.

In general, the shelves are intended to carry a single layer of a product of a predetermined maximum height. This prevents stocking of product that would be top-heavy and tend to tip over the front lip 24b and out of the shelves as the shelves travel through the cam-track segments 54. Designation of maximum height products for the shelves also enables optimization of vertical space by providing a minimized clearance at the top of the unit, between the top closure panel 16 and the maximum sized goods in the revolving shelves. To insure the shelves 24 are used for such appropriately sized products, the carousel shelving unit 10 is provided with additional sensors as indicated at 64 that detects the presence of an inappropriately sized or improperly positioned object on a shelf, and disables the machine until the presence of such object is removed.

For example, if the shelving unit is sized for use with a layer of canned goods of a maximum designated height, the additional sensors will detect the presence of goods having a height greater than such maximum designated height, or the presence of cans stacked on the shelves. Such situations can arise if, for example, a consumer removes a can from a shelf, and then decides to return the can and sets it on top of another can on the shelf, or an inattentive stock person inadvertently stocks the shelves with the wrong sized product. Such instances present the potential of the inappropriately sized or positioned product falling from the shelf as it moves, and/or being crushed into the top panel of the unit, and thereby potentially causing damage to the unit.

Suitable sensors, such as photo cells sensors (not shown) are preferably located above and below the front access opening 18, and are provided as part of a system that is timed with the movement of the shelves to detect the presence of product or other object above a pre-designated height on the shelves as they move from the opening. Upon detection of an inappropriately sized or positioned object, the system stops movement of the shelves, generates a fault detection signal (e.g., audio, visual and/or digital) to notify store personal of the detected condition, and disables further operation of the unit until the condition is cleared from the unit.

From the foregoing, it will be apparent that the present invention brings to the art a new and improved carousel unit that is uniquely adapted to carry and automatically organize products for viewing and selection by all potential users. As a result, the carousel shelving unit (i) provides efficient use of floor space in relation to storing viewable and accessible merchandise, (ii) insures a continuous visually pleasing product presentation at the front of the shelves without the need to employ a stock person to periodically organize the shelves, and (iii) promotes user convenience and safety by bringing the desired product to all users rather than requiring the user to reach for the product above or below his or her comfort range as is required in connection with conventional shelving.

I claim:

1. A shelf carousel comprising:
   a) a plurality of shelves pivotally suspended in a continuous article carrying position for movement along a continuous carousel path having a front path, a back path, and top and bottom paths connecting the front and back paths,
   b) a controllable drive unit connected for powered movement of the shelves along the carousel path and for positioning of individual shelves at an access height along said front path,
   c) a pair of stationary guide track systems (i) spaced on each side of the shelves and (ii) tracking along said carousel path, and
   d) a plurality of tracking elements (i) connected to the shelves for movement therewith and (ii) operatively engaging said guide track systems,
   e) said guide track systems having front cam-track segments vertically spaced above or below the access height in said front path, said cam-track segments being configured to cam said tracking elements and thereby pivot the front of said shelves (i) downwardly from horizontal to a forwardly tipped position as said tracking elements travel therethrough, whereby content on the shelves is slidably biased towards the front of the shelves as said tracking elements travel through said cam-track segments, the front of the shelves being configured to retain the content on the shelves when in is said forwardly tipped position, and (ii) then back to horizontal as said tracking elements exit said cam-track segments and the shelves travel along said front path.

2. The shelf carousel as defined in claim 1 in which said cam-track segments include inner and outer track segments and said tracking elements include inner and outer tracking elements operatively engaging said inner and outer track segments, respectively, said inner and outer track segments being configured to effect pivoting of said inner and outer tracking elements from a first position associated with the horizontal position of the shelves to a second position associated with said tipped position of the shelves and then back to said first position as said tracking elements move therethrough.

3. The shelf carousel as defined in claim 2 in which said inner and outer track segments are provided with respective cam surfaces that progress from parallel to non-parallel and back to parallel in relation to each other, and said inner and outer tracking elements are provided in normal skewed alignment when in said first position, to effect said pivoting of said tracking elements, upon progressing through the cam-track segments.

4. The shelf carousel as defined in claim 2 in which said inner and outer track segments are provided with respective cam surfaces one of which is lengthened as compared to the other, and said inner and outer tracking elements are provided in normal non-horizontal alignment when in said first position, to effect said pivoting of said tracking elements, upon progressing through the cam-track segments.

5. The shelf carousel as defined in claim 2 in which said inner and outer track segments are provided with respective cam surfaces that approach one another and then recede from one another, to effect said pivoting of said tracking elements, upon progressing through the cam-track segments.

6. The shelf carousel as defined in claim 5 in which the inner tracking elements are positioned above the outer tracking elements, and said cam surfaces are operative to cam said tracking elements from said first position towards horizontal alignment therebetween at said second position and then back to said first position.

7. The shelf carousel as defined in claim 2 in which said inner and outer track segments are provided with respective cam surfaces that recede from one another and then approach one another, to effect said pivoting of said tracking elements, upon progressing through the cam-track segments.

8. The shelf carousel as defined in claim 5 in which the inner tracking elements are positioned below the outer tracking elements, and said cam surfaces are operative to cam said tracking elements from said first position towards vertical alignment therebetween at said second position and then back to said first position.

9. The shelf carousel as defined in claim 1 further comprising manually operable controls for said drive unit, said controls being accessible at said access height, and in which said height is established at a wheelchair handicap accessible height.

10. The shelf carousel as defined in claim 9 further comprising an upright, substantially closed cabinet in which the drive unit, the track systems, and the shelves are located, the cabinet being provided with a front access opening at said access height for viewing and selection of particles from the shelves at said height, the cabinet being further provided with safety doors pivotally connected for swinging between (i) a closed position that establishes the top and the bottom of said access opening and (ii) an open position, the safety doors being operative to disable the drive unit when in said open position.

11. A shelf carousel comprising:
  a) a plurality of shelves pivotally suspended in a continuous article carrying position for movement along a continuous carousel path having a front path, a back path, and top and bottom paths connecting the front and back paths,
  b) a controllable drive unit connected for powered movement of the shelves along said carousel path and for positioning of individual shelves at an access height along said front path,
  c) a pair of stationary guide track systems (i) spaced on each side of the shelves and (ii) tracking along said carousel path, said guide track systems comprising:
    (i) a pair of stationary inner guide tracks spaced on each side of the shelves and tracking said front and back paths along said carousel path, and
    (ii) a pair of stationary outer guide tracks tracking said inner guide tracks substantially parallel thereto along said carousel path,
    (iii) the inner and outer guide tracks crossing at one of said top and bottom paths to maintain respective guide track integrity along said carousel path, and
  d) a plurality of pairs of inner and outer tracking elements connected to the shelves for movement therewith, the inner and outer tracking elements being provided in normal non-horizontal alignment and operatively engaging said pairs of inner and outer guide tracks, respectively, therebetween,
  e) said inner and outer guide tracks having inner and outer cam-track segments, respectively, that are vertically spaced above or below the access height, said cam-track segments being configured (i) to cam said pairs of tracking elements on each shelf and thereby tip said shelves forwardly from horizontal, the front of the shelves being configured to retain the content on the shelves when in is said forwardly tipped condition, and (ii) to then cam-return said pairs of tracking elements and thereby return the shelves to horizontal, as the shelves and associated tracking elements travel through said cam-track segments.

12. The shelf carousel as defined in claim 11 in which said inner and outer track segments are provided with respective cam surfaces one of which establishes a lengthened path as compared to the other such that the tracking elements pivot and the shelf tips forwardly as the tracking elements travel and follow the cam surfaces through said cam track segment.

13. The shelf carousel as defined in claim 11 in which said inner and outer tracking elements are provided in a first non-horizontal alignment position associated with the horizontal position of the shelves, and said inner and outer track segments are provided with respective cam surfaces that approach one another and then recede from one another to cam said tracking elements from said first position towards horizontal alignment therebetween associated with the tipped position of the shelves and then back to said first position upon progressing through the cam-track segments.

14. The shelf carousel as defined in claim 11 in which said inner and outer tracking elements are provided in a first non-vertical alignment position associated with the horizontal position of the shelves, and said inner and outer track segments are provided with respective cam surfaces that recede from one another and then approach one another to cam said tracking elements from said first position towards vertical alignment therebetween associated with the tipped position of the shelves and then back to said first position upon progressing through the cam-track segments.

15. The shelf carousel as defined in claim 11 further comprising manually operable drive unit controls proximate said access height, and in which said access height is established at a wheelchair handicap accessible height.

16. The shelf carousel as defined in claim 15 further comprising an upright, substantially closed cabinet in which the drive chains, track systems, and shelves are located, the cabinet being provided with a front access opening at said access height for viewing and selection of articles from the shelves at said height, the cabinet being further provided with safety doors pivotally connected for swinging between a closed position that establishes the top and the bottom of said access opening and an open position, the safety doors being operative to disable the drive unit when in said open position.

17. A carousel shelving unit comprising:
  a) an upright cabinet having a front, a back, and opposite sides, and having closure panels substantially closing the front and sides thereof,
  b) the cabinet being provided with a front access opening, and safety doors pivotally mounted above and below the access opening to establish the top and bottom thereof,
  c) a pair of laterally spaced drive chains supported at said opposite sides inside the cabinet for rotation along a vertical carousel path having a front path, a back path, and top and bottom paths connecting the front and back paths,
  d) a pair of stationary laterally spaced guide track systems tracking said drive chains along said carousel path,
  e) each guide track system comprising front and back track segments, and top and bottom cross-over track segments connecting the front and back track segments, each front track segment including upper and lower cam-track segments,
  f) each guide track system having substantially parallel, substantially continuous inner and outer tracks (i) defined in said track segments and (ii) crossing in one of said top and bottom track segments to maintain respective track integrity along said front and back paths,
  g) a plurality of shelves pivotally suspended in a continuous article carrying normally horizontal position between the drive chains for movement therewith along said carousel path,
  h) a plurality of front and back pairs of inner and outer tracking elements connected to the shelves for movement therewith,
    (1) the back pairs of inner and outer tracking elements operatively engaging said pairs of inner and outer guide tracks in the back track segments,
    (2) the front pairs of inner and outer tracking elements operatively engaging the pairs of inner and outer guide tracks in the front track segments,
    (3) with transitioning operative engagement between the front and back pairs of tracking elements effected in the top and bottom cross-over track segments, and
    (4) the inner and outer tracking elements of each pair being provided in normal non-horizontal alignment first position associated with the shelves in said horizontal position;

i) the inner and outer tracks in the cam-track segments having associated first cam surfaces slidably engaging and configured to cam-pivot said front pairs of inner and outer tracking elements from said first position and thereby pivot said shelves forwardly from horizontal, the front of the shelves being configured to retain the content on the shelves when in said forwardly pivoted condition, and having associated second cam surfaces slidably engaging and configured to return-pivot said pairs of tracking elements to said first position and thereby return-pivot the shelves to their horizontal position, as the shelves travel therethrough, j) a bi-directional drive unit connected for powered movement of the drive chains and shelves along said carousel path, and k) manually operable controls located proximate the access opening at the front of the cabinet for controlling the drive unit and positioning of individual shelves at said access opening.

18. The shelf carousel as defined in claim 17 in which said inner tracking elements are positioned above the outer tracking elements when in said first position, and said inner and outer track segments are provided with respective cam surfaces that approach one another and then recede from one another to cam said tracking elements from said first position towards horizontal alignment therebetween associated with the tipped position of the shelves and then back to said first position upon progressing through the cam-track segments.

19. The shelf carousel as defined in claim 17 in which said inner tracking elements are positioned below the outer tracking elements when in said first position, and said inner and outer track segments are provided with respective cam surfaces that recede from one another and then approach one another to cam said tracking elements from said first position towards vertical alignment therebetween associated with the tipped position of the shelves and then back to said first position upon progressing through the cam-track segments.

20. The shelf carousel as defined in claim 17 further comprising a second sensor to detect an improperly sized or positioned object on the shelves.

* * * * *

UNITED STATES PATENT AND TRADEMARK OFFICE
CERTIFICATE OF CORRECTION

PATENT NO. : 6,854,815 B1
DATED : February 15, 2005
INVENTOR(S) : John T. Smith

It is certified that error appears in the above-identified patent and that said Letters Patent is hereby corrected as shown below:

Column 11,
Line 31, between the words "carousel" and "unit", add the word -- shelving --.

Column 12,
Line 66, change the word "particles" to -- articles --.

Signed and Sealed this

Eighth Day of November, 2005

JON W. DUDAS
*Director of the United States Patent and Trademark Office*